United States Patent
Kim et al.

(10) Patent No.: US 8,055,056 B2
(45) Date of Patent: Nov. 8, 2011

(54) METHOD OF DETECTING DEFECTS OF PATTERNS ON A SEMICONDUCTOR SUBSTRATE AND APPARATUS FOR PERFORMING THE SAME

(75) Inventors: Jong-An Kim, Seoul (KR); Yu-Sin Yang, Seoul (KR); Chung-Sam Jun, Suwon-si (KR); Moon-Shik Kang, Yongin-si (KR); Ji-Hye Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1037 days.

(21) Appl. No.: 11/934,972

(22) Filed: Nov. 5, 2007

(65) Prior Publication Data

US 2008/0107329 A1 May 8, 2008

(30) Foreign Application Priority Data

Nov. 6, 2006 (KR) .................. 10-2006-0108782

(51) Int. Cl.
*G06K 9/00* (2006.01)
*G01N 21/00* (2006.01)

(52) U.S. Cl. ..... 382/141; 382/147; 382/149; 356/237.1; 356/237.4

(58) Field of Classification Search .......... 382/141, 382/149, 291, 147, 218, 145, 144, 146, 148, 382/100, 276, 286; 356/237.4, 237.5, 237.6, 356/400, 239.2, 239.3, 239.4, 239.6, 237.1; 250/559.4, 559.41, 559.42, 559.43, 559.44, 250/559.46, 559.45, 306, 310; 702/35; 324/758, 324/750, 751, 752; 348/126
See application file for complete search history.

(56) References Cited

U.S. PATENT DOCUMENTS

| | | | | |
|---|---|---|---|---|
| 6,724,005 | B2 * | 4/2004 | Tokumoto | 250/559.4 |
| 6,972,576 | B1 * | 12/2005 | Lyons et al. | 324/699 |
| 7,092,095 | B2 * | 8/2006 | Shibata et al. | 356/369 |
| 7,706,597 | B2 * | 4/2010 | Yoneyama et al. | 382/145 |
| 7,769,225 | B2 * | 8/2010 | Kekare et al. | 382/145 |

FOREIGN PATENT DOCUMENTS

| | | |
|---|---|---|
| JP | 06-036016 | 2/1994 |
| JP | 2002-131253 | 5/2002 |
| JP | 2005-195607 | 7/2005 |

* cited by examiner

*Primary Examiner* — Sheela Chawan (74) *Attorney, Agent, or Firm* — F. Chau & Associates, LLC (57) ABSTRACT

In a method of detecting defects of patterns on a semiconductor substrate and an apparatus for performing the method information on positions of reference defects influencing an operation of a circuit including the patterns when the patterns are formed on the semiconductor substrate is acquired in advance. Preliminary defects of the patterns formed on the semiconductor substrate are detected. Positions of the preliminary defects of the patterns are compared with positions of the reference defects. The preliminary defects having the positions substantially the same as the positions of the reference defects are set to be defects of the patterns so that the actual defects are detected.

14 Claims, 5 Drawing Sheets

METHOD OF DETECTING DEFECTS OF PATTERNS ON A SEMICONDUCTOR SUBSTRATE AND APPARATUS FOR PERFORMING THE SAME

CROSS-REFERENCE TO RELATED APPLICATION

This application claims priority under 35 U.S.C. §119 to Korean Patent Application No. 2006-108782 filed on Nov. 6, 2006 in the Korean Intellectual Property Office (KIPO), the contents of which are herein incorporated by reference in their entirety.

BACKGROUND OF THE INVENTION

1. Technical Field

Exemplary embodiments of the present invention relate to a method of detecting defects of patterns on a semiconductor substrate and apparatus for performing the method. More specifically exemplary embodiments of the present invention relate to a method of detecting defects of patterns on a semiconductor substrate and apparatus for performing the method in order to detect only defects that influence an operation of a circuit including the pattern.

2. Discussion of Related Art

Generally, detection sensitivity is proportional to the number of defects detected by an apparatus for detecting defects of patterns on a semiconductor substrate. As the detection sensitivity of the detection apparatus increases, the number of defects of the patterns on the semiconductor substrate that are detected by the apparatus increases. On the other hand, as the detection sensitivity of the detection apparatus decreases, the number of defects of the patterns on the semiconductor substrate that are detected by the apparatus decreases.

According to the reduction of a design rule of a semiconductor device and the minute sizes of patterns, the detection sensitivity of the detection apparatus is set high in order to detect minute defects of the patterns. Therefore, the number of defects of the patterns on the semiconductor substrate detected by the apparatus increases, so that it is difficult to selectively detect only defects influencing an operation of a circuit including the patterns from among all of the defects that are detected. When the detection sensitivity is not set high, the defects of the patterns on the semiconductor substrate may not all be detected.

SUMMARY OF THE INVENTION

Exemplary embodiments of the present invention provide a method of detecting defects of patterns on a semiconductor substrate precisely and with a high detection sensitivity.

Exemplary embodiments of the present invention provide apparatus for performing the above-mentioned method.

According to an exemplary embodiment of the present invention, there is provided a method of detecting defects of patterns on a semiconductor substrate, in which preliminary defects of the patterns formed on the semiconductor substrate are detected. Positions of the preliminary defects of the patterns are compared with positions of reference defects, and preliminary defects having positions substantially the same as the positions of the reference defects among all of the preliminary defects are set to be defects of the patterns.

In exemplary embodiments of the present invention, information on the positions of the reference defects influencing an operation of a circuit including the patterns when the patterns are formed on the semiconductor substrate may be acquired. The positions of the reference defects may include positions where defects may be generated repeatedly in patterns on a plurality of semiconductor substrates respectively, even though exposure process conditions for forming the patterns on the plurality of the semiconductor substrates may vary. The positions of the reference defects may include positions where defects are generated repeatedly as acquired from detecting entire defects of the patterns. The positions of the reference defects may include positions where defects are generated repeatedly as acquired from repeated simulations of an exposure process for forming the patterns. The reference defects may include thinning defects where critical dimensions of the patterns become narrower, bridge defects where adjacent patterns are connected to each other, and notch defects where the patterns are cut.

In exemplary embodiments of the present invention, the positions of the preliminary defects of the patterns may be compared with the positions of the reference defects by overlapping an actual map, on which the positions of the preliminary defects of the patterns are marked, with a reference map, on which the positions of the reference defects are marked.

In exemplary embodiments of the present invention, the positions of the preliminary defects of the patterns may be compared with the positions of the reference defects by comparing preliminary coordinate values of the positions of the preliminary defects of the patterns with reference coordinate values of the positions of the reference defects.

According to an exemplary embodiment of the present invention, an apparatus for detecting defects of patterns on a semiconductor substrate includes an acquisition unit, a comparison unit, and a set unit. The acquisition unit acquires information on positions of reference defects influencing an operation of a circuit including the patterns, when the patterns are formed on the semiconductor substrate. The detection unit detects preliminary defects of the patterns formed on the semiconductor substrate. The comparison unit compares positions of the reference defects with positions of the preliminary defects of the patterns. The set unit sets defects having positions substantially the same as the positions of the reference defects among all of the preliminary defects as defects of the patterns.

In exemplary embodiments of the present invention, the apparatus may further include a display unit for displaying a setting result of the set unit.

According to exemplary embodiments of the present invention, positions of the reference patterns may include positions where defects are generated repeatedly in patterns on a plurality of semiconductor substrates, even though exposure process conditions for forming the patterns may vary.

In exemplary embodiments of the present invention, positions of the reference patterns may include positions where defects are generated repeatedly as acquired from detecting all of the defects of patterns on a plurality of semiconductor substrates.

According to exemplary embodiments of the present invention, positions of the reference patterns may include positions where defects are generated repeatedly as acquired from repeated simulations of an exposure process for forming the patterns.

In exemplary embodiments of the present invention, the reference defects may include thinning defects where critical dimensions of the patterns become narrower, bridge defects where adjacent patterns are connected to each other, and notch defects where the patterns are cut.

According to exemplary embodiments of the present invention, the comparison unit may compare positions of the preliminary defects of the patterns with positions of the reference defects by overlapping an actual map, on which the positions of the preliminary defects of the patterns are marked, with a reference map, on which the positions of the reference defects are marked.

In exemplary embodiments of the present invention, the comparison unit may compare positions of the preliminary defects of the patterns with positions of the reference defects by comparing preliminary coordinate values of the positions of the preliminary defects of the patterns with reference coordinate values of the positions of the reference defects.

According to exemplary embodiments of the present invention, preliminary defects are detected from patterns of a semiconductor substrate precisely, and defects of the semiconductor substrate are set by comparing positions of the detected preliminary defects with positions of the reference defects. Therefore, the defects including thinning defects, bridge effects, notch defects, and the like, may be detected precisely from the patterns of the semiconductor substrate.

BRIEF DESCRIPTION OF THE DRAWINGS

Exemplary embodiments of the present invention will be understood in more detail from the following descriptions taken in conjunction with the accompanying drawings, wherein.

DETAILED DESCRIPTION OF EXEMPLARY EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those of ordinary skill in the art.

Figure 1:
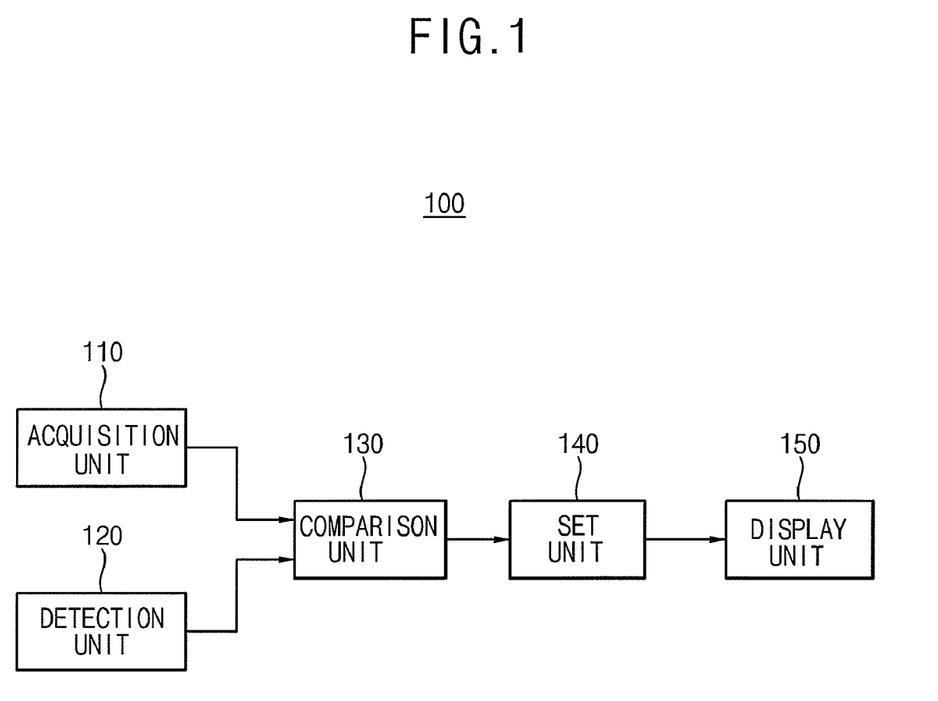
FIG. 1 is a block diagram illustrating an apparatus for detecting defects of patterns on a semiconductor substrate in accordance with an exemplary embodiment of the present invention.

FIG. 1 is a block diagram illustrating an apparatus for detecting defects of patterns on a semiconductor substrate in accordance with an exemplary embodiment of the present invention.

Referring to FIG. 1, the apparatus for detecting defects of patterns on a semiconductor substrate 100 includes an acquisition unit 110, a detection unit 120, a comparison unit 130, a set unit 140, and a display unit 150.

The acquisition unit 110 may acquire information on reference defects of patterns on a semiconductor substrate. The reference defects may be fatal, in that the reference defects may adversely influence an operation of a circuit including the patterns when the patterns are formed on the semiconductor substrate. Examples of the reference defects may include thinning defects, bridge defects, notch defects, and the like. The thinning defects may be defects where critical dimensions of the patterns are smaller than predetermined critical dimensions. The bridge defects may be defects where the adjacent patterns are connected to each other. The notch defects may be defects where the patterns are cut.

The information on the reference defects acquired from the acquisition unit 110 should include positions of the reference defects. In exemplary embodiments of the present invention, the positions of the reference defects may be positions where defects are generated repeatedly in patterns formed on a plurality of semiconductor substrates respectively due to minute variations of exposure process conditions for forming the patterns on the plurality of the semiconductor substrates.

In exemplary embodiments of the present invention, the positions of the reference defects may be positions where defects are generated repeatedly as acquired from detecting all of the defects of patterns formed on a plurality of semiconductor substrates respectively using the same reticle pattern.

In exemplary embodiments of the present invention, the positions of the reference defects may be positions where defects are generated repeatedly as acquired from repeated simulations of exposure processes for forming the patterns using a designed reticle pattern.

The acquisition unit 110 may acquire positions of the reference defects of a die among the patterns formed on the semiconductor substrate, and may acquire positions of the reference defects of entire patterns on the semiconductor substrate by copying the acquiring results to another die.

Figure 3:
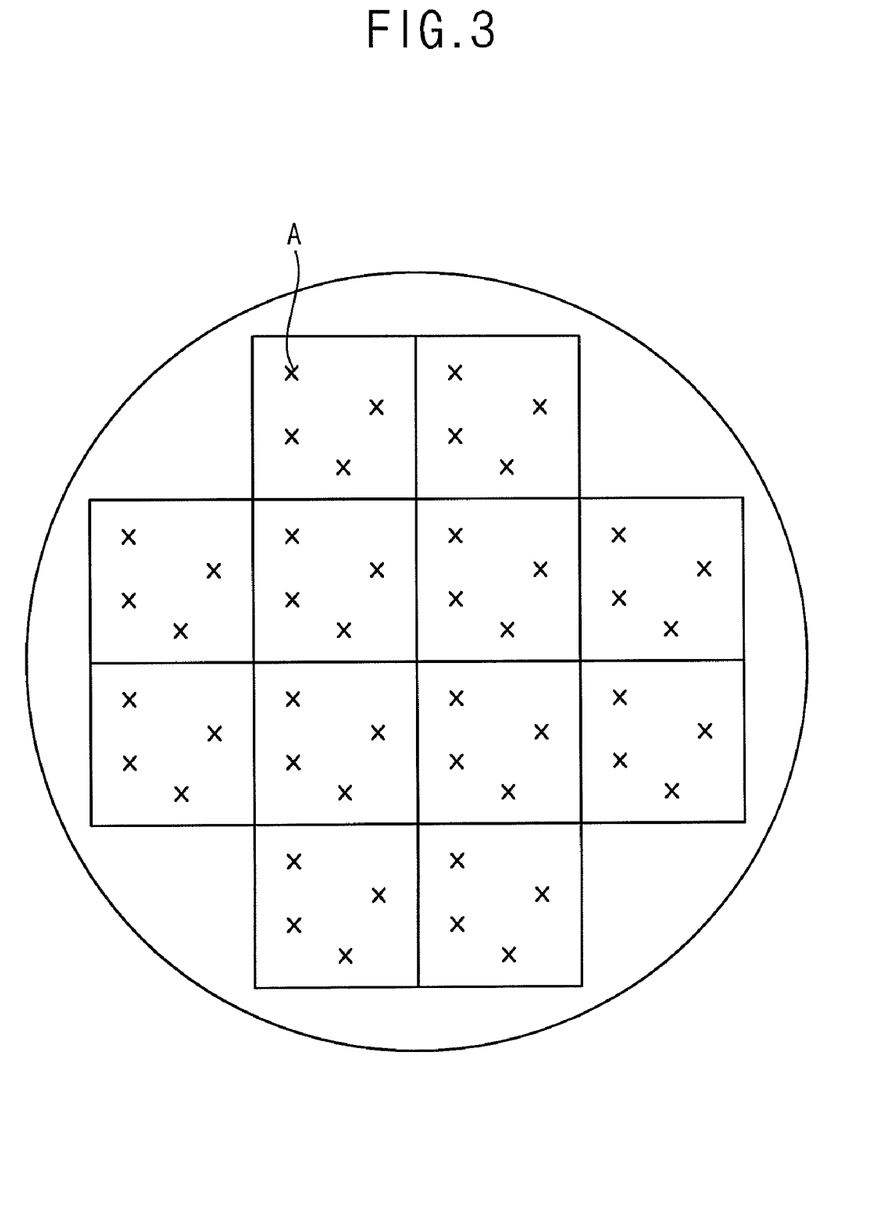
FIG. 3 is a reference map illustrating positions of reference defects in accordance with an exemplary embodiment of the present invention.

In exemplary embodiments of the present invention, the acquisition unit 110 may display the positions of the reference defects, one of which is shown typically at A, in a map style illustrated in FIG. 3. In exemplary embodiments of the present invention, the acquisition unit 110 may display the positions of the reference defects in rectilinear or polar coordinates, for example.

The detection unit 120 may detect preliminary defects of the patterns formed on the semiconductor substrate. In exemplary embodiments of the present invention, the detection unit 120 may include a light source for projecting light onto the semiconductor substrate where the patterns are formed, and a detector for detecting and analyzing the light reflected or scattered from the semiconductor substrate. The light source may project a light beam to scan the semiconductor substrate and the detector may identify existences of the preliminary defects of the patterns and detect positions of the preliminary defects by detecting and analyzing the light reflected or scattered from the patterns. In exemplary embodiments of the present invention, the acquisition unit 120 may include an image photographing device for photographing an image of the patterns formed on the semiconductor substrate. An example of such an image photographing device is a charge coupled device (CCD) camera. The existences of the preliminary defects of the patterns may be identified and the positions of the preliminary defects may be detected by comparing a pattern image acquired from the image photographing device and a reference pattern image of normal patterns.

Figure 4:
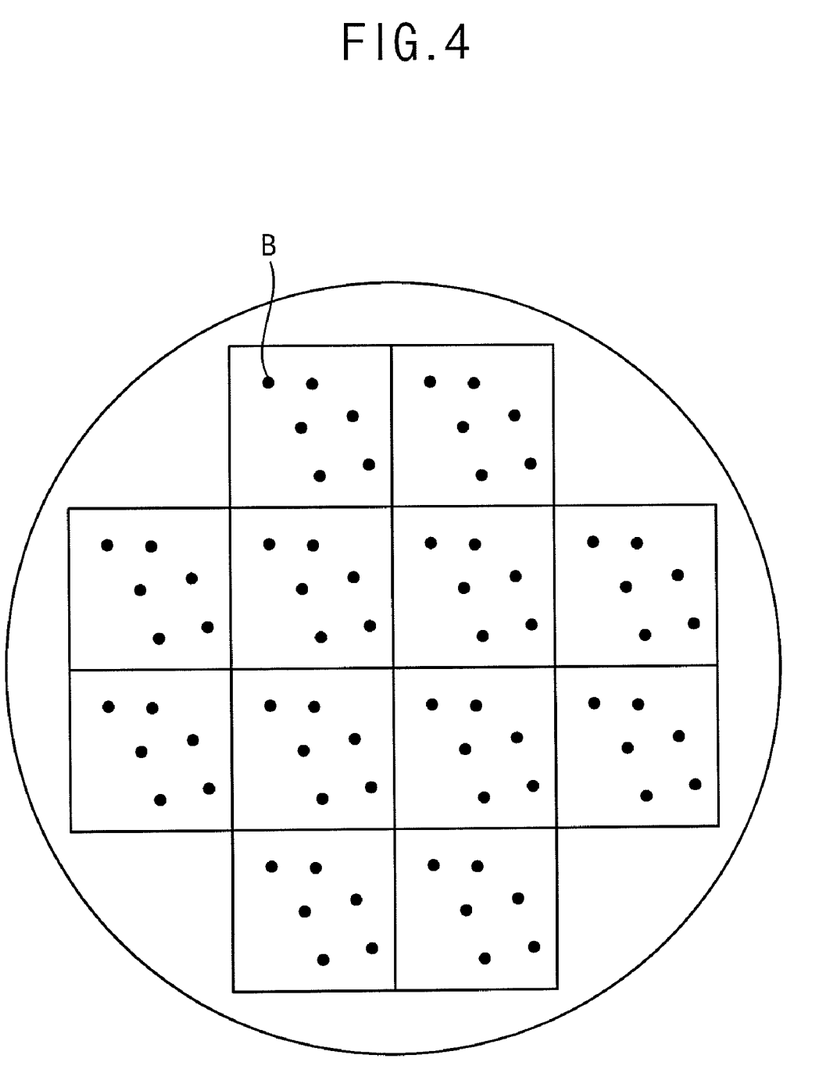
FIG. 4 is an actual map illustrating positions of preliminary defects in accordance with an exemplary embodiment of the present invention.

In exemplary embodiments of the present invention, the detection unit 120 may display the positions of the preliminary defects, one of which is shown typically at B, in a map form illustrated in FIG. 4. In exemplary embodiments of the present invention, the detection unit 120 may display the positions of the preliminary defects in rectilinear or polar coordinates, for example.

The detection unit 120 may detect the preliminary defects of the patterns precisely. The preliminary defects may include defocusing defects, random defects, false defects, and the like, as well as thinning defects, bridge defects, notch defects, and the like, of conventional defects. The defocusing defects may be defects due to an incorrect focus of a light source during an exposure process, and the random defects may be defects generated at random. The false defects may be defects that are detected during the defect detection process, even though no defect exists. That is, the false defects are not real defects.

The comparison unit 130 may compare the preliminary defects of the patterns detected from the detection unit 120 and the reference defects acquired from the acquisition unit 110. The comparison unit 130 may compare the positions of the reference defects with the positions of the preliminary defects. In exemplary embodiments of the present invention, the comparison unit 130 may compare the positions of the reference defects with the positions of the preliminary defects by overlapping an actual map where the positions of the preliminary defects of the patterns are marked with a reference map where the positions of the reference defects of the patterns are marked. In exemplary embodiments of the present invention, the comparison unit 130 may compare the positions of the reference defects with the positions of the preliminary defects by comparing preliminary coordinate values of the positions of the preliminary defects of the patterns with reference coordinate values of the positions of the reference defects of the patterns.

The set unit 140 may set defects of the patterns among the preliminary defects according to the comparing results from the comparison unit 130. Defects having positions substantially the same as those of the reference defects may be set as the defects of the patterns. In exemplary embodiments of the present invention, in accordance with results of overlapping the map where the positions of the preliminary defects of the patterns are marked with the map where the positions of the reference defects of the patterns are marked, the set unit 140 may set the preliminary defects having the positions substantially the same as the positions of the reference defects as the defects of the patterns. One such defect is typically shown at C in FIG. 5. In exemplary embodiments of the present invention, in accordance with results of comparing the preliminary coordinate values of the positions of the preliminary defects of the patterns with the reference coordinate values of the positions of the reference defects of the patterns, the set unit 140 may set the preliminary defects having the preliminary coordinate values substantially the same as the reference coordinate values of the reference defects as the defects of the patterns.

Figure 5:
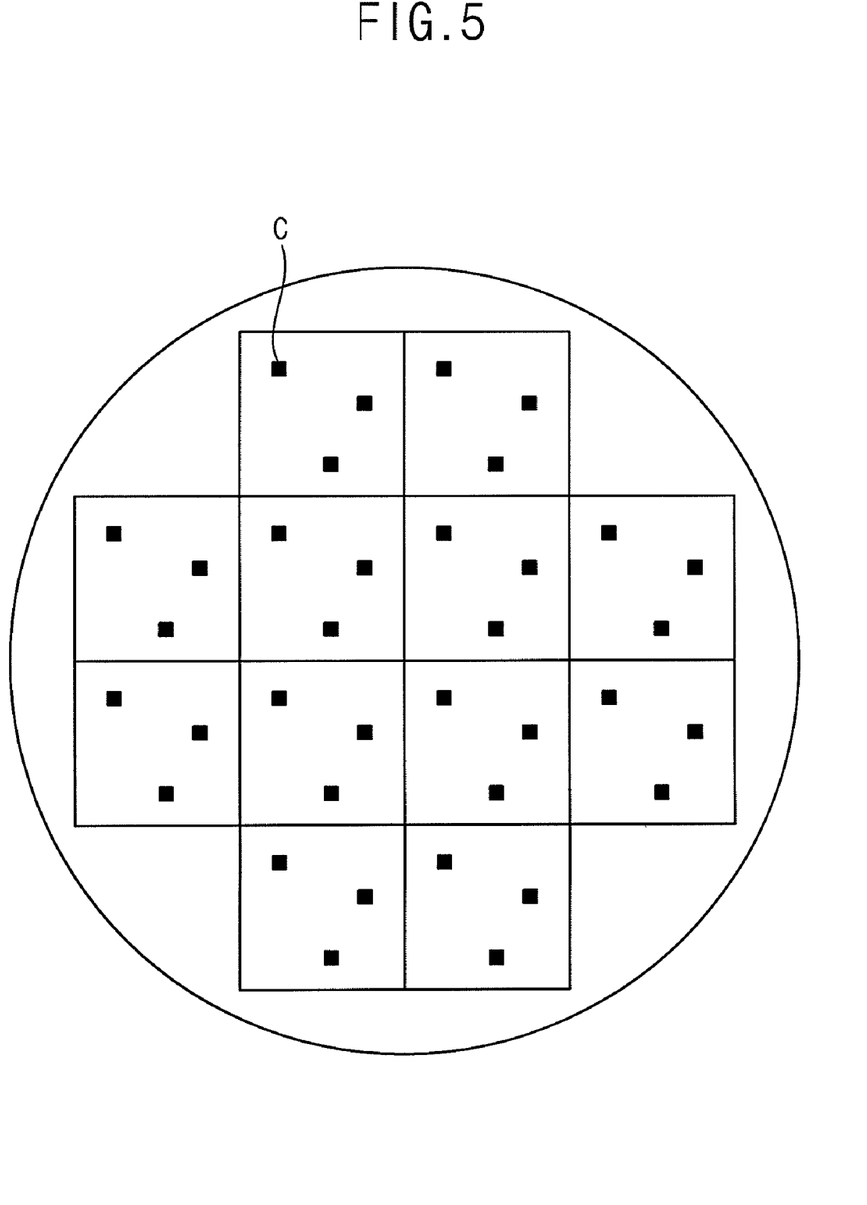
FIG. 5 is a result map illustrating positions of defects in accordance with an exemplary embodiment of the present invention.

The display unit 150 may display the defects of the patterns set by the set unit 140 in a map form as illustrated FIG. 5. One example of the display unit 150 is a monitor. When the defects of the patterns are set by overlapping the map, on which the positions of the preliminary defects of the patterns are marked, with the map, on which the positions of the reference defects of the patterns are marked, the display unit 150 may display only the preliminary defects having the positions substantially the same as the positions of the reference defects on a resultant map. When the defects of the patterns are set by comparing the preliminary coordinate values of the positions of the preliminary defects of the patterns with the reference coordinate values of the positions of the reference defects of the patterns, the display unit 150 may display only the preliminary defects having the preliminary coordinate values substantially the same as the reference coordinate values of the reference defects on the map.

The apparatus for detecting defects of patterns on a semiconductor substrate 100 may inspect the patterns on the semiconductor substrate precisely and may detect only the defects that are fatal to the patterns on the semiconductor substrate selectively.

Figure 2:
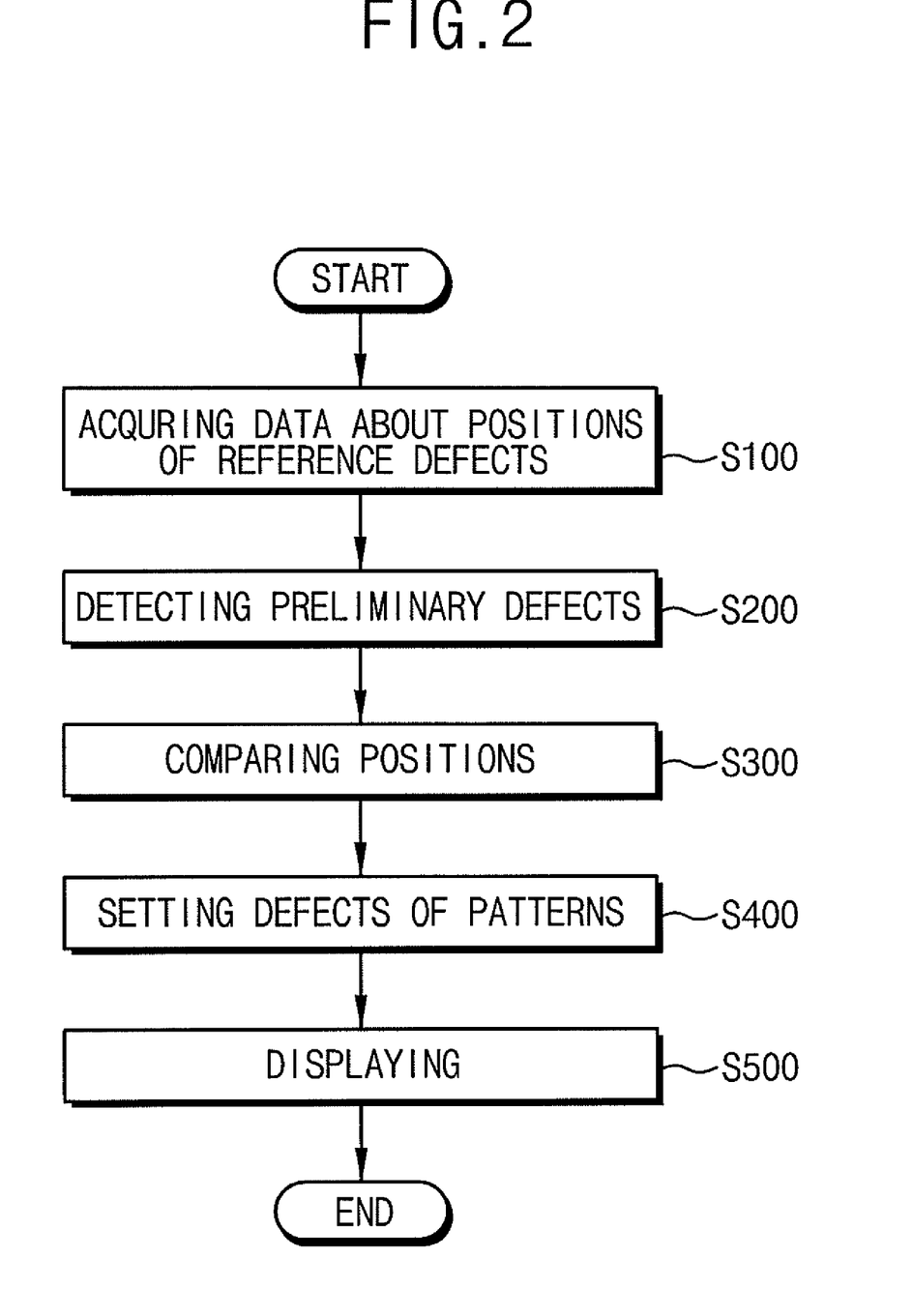
FIG. 2 is a flow chart illustrating a method of detecting defects of patterns on a semiconductor substrate in accordance with an exemplary embodiment of the present invention.

FIG. 2 is a flow chart illustrating a method of detecting defects of patterns on a semiconductor substrate in accordance with an exemplary embodiment of the present invention.

Referring to FIG. 2, information or data with respect to reference defects generated in patterns on a semiconductor substrate is acquired in step S100. The reference defects may be fatal so that the reference defects may influence an operation of a circuit including the patterns when the patterns are formed on the semiconductor substrate. Examples of the reference defects may be thinning defects, bridge defects, notch defects, and the like. The information on the reference defects may include positions of the reference defects.

In exemplary embodiments of the present invention, patterns are formed on a plurality of semiconductor substrates respectively with minute variations of exposure process conditions for forming the patterns on the semiconductor substrate. Defects of the patterns are detected respectively. The reference defects are those generated repeatedly in the patterns and are identified among the defects. The positions of the reference defects are acquired from the information on the reference defects.

In exemplary embodiments of the present invention, patterns are formed on a plurality of semiconductor substrates using the same reticle pattern, respectively. Defects of the patterns are detected, respectively. The reference defects that are generated repeatedly in the same position of each of the patterns are identified among the defects. The positions of the reference defects are acquired from the information on the reference defects.

In exemplary embodiments of the present invention, a plurality of simulated patterns is formed by repeated simulations of exposure processes using a designed reticle pattern. Defects of the simulated patterns are detected respectively. The reference defects that are generated in the same positions of each of the patterns are identified among the defects. The positions of the reference defects are acquired from the information on the reference defects.

The positions of the reference defects of entire patterns of the semiconductor substrate may be acquired by acquiring the positions of the reference defects of a die among the patterns formed on the semiconductor substrate and copying the acquiring results to another die.

In exemplary embodiments of the present invention, the positions of the reference defects, one of which is shown typically at A, may be displayed in a map form as illustrated in FIG. 3. In exemplary embodiments of the present invention, the positions of the reference defects may be displayed in rectilinear or polar coordinates for example.

Preliminary defects of patterns formed on a semiconductor substrate are detected in step S200. The patterns are formed on the semiconductor substrate by transferring a reticle pattern substantially the same as the pattern used when the information on the reference defects is acquired. The preliminary defects of the patterns are detected precisely. The preliminary defects may include defocusing defects, random defects, false defects, and the like, as well as the reference defects including thinning defects, bridge defects, notch defects, and the like.

For example, a light source may project light in order to scan the semiconductor substrate, and a detector may detect and inspect the light reflected or scattered from the patterns, so that existence of the preliminary defects of the patterns is identified and positions of the preliminary defects are detected.

As another example, existence of the preliminary defects of the patterns is identified and positions of the preliminary defects are detected by comparing an image of the patterns acquired from an image photographing device with a reference pattern image of normal patterns.

The positions of the preliminary defects, one of which is shown typically at B, may be displayed in a map form, as illustrated in FIG. 4. Alternatively, the positions of the preliminary defects may be displayed in rectilinear or polar coordinates, for example.

The positions of the preliminary defects of the patterns are compared with the positions of the reference defects in step S300. The positions of the preliminary defects of the patterns may be compared with the positions of the reference defects by overlapping the map where the positions of the preliminary defects of the patterns are marked with the map where the positions of the reference defects are marked. Alternatively, the positions of the preliminary defects of the patterns may be compared with the positions of the reference defects by comparing the preliminary coordinate values of the positions of the preliminary defects of the patterns with the reference coordinate values of the positions of the reference defects.

Defects having positions substantially the same as those of the reference defects among the preliminary defects are set to be defects of the patterns in step S400. As a result of comparing the positions of the preliminary defects with the positions of the reference defects, defects having positions substantially the same as those of the reference defects among the preliminary defects are set as defects of the patterns. For example, as a result of overlapping the map where the positions of the preliminary defects of the patterns are marked with the map where the positions of the reference defects are marked, the preliminary defects having positions substantially the same as those of the reference defects are set to be the defects of the patterns as shown in FIG. 5. One typical defect is shown at C. Alternatively, as a result of comparing the preliminary coordinate values of the positions of the preliminary defects of the patterns with the reference coordinate values of the positions of the reference defects, the preliminary defects having the preliminary coordinate values substantially the same as the reference coordinate values of the reference defects are set to be the defects of the patterns.

The set defects of the patterns are displayed in step S500. The defects of the patterns may be displayed in a map form, such as illustrated in FIG. 5. When the defects of the patterns are set by overlapping the map, on which the positions of the preliminary defects of the patterns are marked, with the map on which the positions of the reference defects are marked, the preliminary defects having the positions substantially the same as the positions of the reference defects are displayed on the map. When the defects of the patterns are set by comparing the preliminary coordinate values of the positions of the preliminary defects of the patterns with the reference coordinate values of the positions of the reference defects, the preliminary defects having the preliminary coordinate values substantially the same as the reference coordinate values of the reference defects are displayed on the map.

In this exemplary embodiment, the method of detecting defects of patterns on a semiconductor substrate may accurately inspect the patterns of the semiconductor substrate. More specifically, the method of this exemplary embodiment may selectively detect only the defects that are fatal to the patterns on the semiconductor substrate.

According to exemplary embodiments of the present invention, only defects having positions substantially the same as those of reference defects that are acquired in advance among detected preliminary defects of patterns are set to be defects of the patterns. Therefore, the defects of the semiconductor substrate can be detected easily, even though inspected with high sensitivity.

The foregoing is illustrative of the present invention and is not to be construed as limiting thereof. Although exemplary embodiments of the present invention have been described, those of ordinary skill in the art will readily appreciate that many modifications are possible in the exemplary embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of detecting defects of patterns on a semiconductor substrate, comprising:

acquiring information on positions of reference defects influencing an operation of a circuit including the patterns when the patterns are formed on the semiconductor substrate;

detecting preliminary defects of the patterns formed on the semiconductor substrate;

comparing positions of the preliminary defects of the patterns with the previously acquired positions of the reference defects; and setting the preliminary defects having positions substantially the same as the positions of the reference defects from among all of the detected preliminary defects to be the actual defects of the patterns, wherein comparing positions of the preliminary defects of the patterns with the positions of the reference defects comprises overlapping an actual map where the positions of the preliminary defects of the patterns are marked with a reference map where the positions of the reference defects are marked.

2. The method of claim 1, wherein acquiring information on the positions of the reference defects comprises:

forming the patterns on a plurality of the semiconductor substrates, respectively, with varying exposure process conditions;

detecting the defects of the formed patterns; and identifying the reference defects formed repeatedly in a same position of each of the patterns from among the detected defects.

3. The method of claim 1, wherein acquiring information on the positions of the reference defects comprises:

forming the patterns on a plurality of the semiconductor substrates respectively using a same reticle pattern;

detecting the defects of the formed patterns; and identifying the reference defects formed repeatedly in a same position of each of the patterns from among the detected defects.

4. The method of claim 1, wherein acquiring information on the positions of the reference defects comprises:

forming a plurality of simulated patterns by repeated simulations using a designed reticle pattern;

detecting defects of the formed simulated patterns; and identifying the reference defects formed repeatedly in a same position of each of the simulated patterns from among the detected defects.

5. The method of claim 1, wherein the reference defects comprise at least one selected from the group consisting of thinning defects where critical dimensions of the patterns become narrower, bridge defects where adjacent patterns are connected each other, and notch defects where the patterns are cut.

6. The method of claim 1, wherein comparing positions of the preliminary defects of the patterns with the positions of reference defects comprises comparing preliminary coordinate values of the positions of the preliminary defects of the patterns with reference coordinate values of the positions of the reference defects.

7. The method of claim 1, further comprising displaying the set defects of the patterns on a map having a shape of the semiconductor substrate.

8. An apparatus for detecting defects of patterns on a semiconductor substrate, comprising:

acquisition unit hardware for acquiring information on positions of reference defects influencing an operation of a circuit including the patterns when the patterns are formed on the semiconductor substrate;

detection unit hardware for detecting preliminary defects of the patterns formed on the semiconductor substrate;

comparison unit hardware for comparing positions of the reference defects with positions of the preliminary defects of the patterns; and set unit hardware for setting the preliminary defects having positions substantially the same as the positions of the reference defects from among all of the detected preliminary defects to be actual defects of the patterns, wherein the comparison unit hardware compares positions of the preliminary defects of the patterns with positions of the reference defects by overlapping an actual map where the positions of the preliminary defects of the patterns are marked with a reference map where the positions of the reference defects are marked.

9. The apparatus of claim 8, further comprising display unit hardware for displaying a setting result of the set unit.

10. The apparatus of claim 9, wherein the positions of the reference patterns comprise positions where defects are generated repeatedly in the patterns formed on a plurality of the semiconductor substrates respectively by varying an exposure process condition for forming the patterns on the plurality of the semiconductor substrates.

11. The apparatus of claim 9, wherein the positions of the reference patterns comprise positions where defects are generated repeatedly as acquired from detecting all of the defects of the patterns formed on a plurality of the semiconductor substrates respectively using a same reticle pattern.

12. The apparatus of claim 9, wherein the positions of the reference patterns comprise positions where the defects are generated repeatedly as acquired from repeated simulations of an exposure process for forming the patterns using a designed reticle pattern.

13. The apparatus of claim 9, wherein the reference defects comprise at least one selected from the group consisting of thinning defects where critical dimensions of the patterns become narrower, bridge defects where adjacent patterns are connected each other, and notch defects where the patterns are cut.

14. The apparatus of claim 8, wherein the comparison unit hardware compares positions of the preliminary defects of the patterns with positions of the reference defects by comparing preliminary coordinate values of the positions of the preliminary defects of the patterns with reference coordinate values of the positions of the reference defects.

* * * * *